(12) United States Patent
Goldammer et al.

(10) Patent No.: US 8,610,382 B2
(45) Date of Patent: Dec. 17, 2013

(54) ACTIVE HIGH VOLTAGE BUS BLEED DOWN

(75) Inventors: Timothy Goldammer, Dunlap, IL (US); Thuong Le, Edwards, IL (US); Jason Miller, Peoria, IL (US); Jackson Wai, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 357 days.

(21) Appl. No.: 12/978,041

(22) Filed: Dec. 23, 2010

(65) Prior Publication Data

US 2012/0161679 A1   Jun. 28, 2012

(51) Int. Cl.
*H02P 1/00* (2006.01)

(52) U.S. Cl.
USPC .......................................... 318/139; 318/140

(58) Field of Classification Search
USPC ................................... 318/139, 140
See application file for complete search history.

(56) References Cited

U.S. PATENT DOCUMENTS

| | | | |
|---|---|---|---|
| 5,091,679 A | 2/1992 | Murty et al. | |
| 5,493,195 A | 2/1996 | Heglund et al. | |
| 5,714,869 A * | 2/1998 | Tamechika et al. | 320/101 |
| 7,298,102 B2 * | 11/2007 | Sopko et al. | 318/139 |
| 7,378,808 B2 * | 5/2008 | Kuras et al. | 318/139 |
| 7,471,008 B2 | 12/2008 | Stahlhut et al. | |
| 7,616,421 B2 * | 11/2009 | Hickam | 361/93.1 |
| 2003/0020436 A1 | 1/2003 | Coles et al. | |
| 2005/0263329 A1 | 12/2005 | Kuras et al. | |
| 2007/0080236 A1 * | 4/2007 | Betz et al. | 237/12.1 |
| 2008/0157593 A1 | 7/2008 | Bax et al. | |
| 2009/0001911 A1 * | 1/2009 | Kayikci et al. | 318/254.1 |
| 2009/0141412 A1 | 6/2009 | Hickam | |
| 2009/0211826 A1 | 8/2009 | Hashimoto | |
| 2010/0094490 A1 | 4/2010 | Alston et al. | |
| 2010/0156117 A1 | 6/2010 | Allen | |
| 2010/0236851 A1 | 9/2010 | Van Maanen et al. | |

FOREIGN PATENT DOCUMENTS

| | | |
|---|---|---|
| EP | 2055592 | 5/2009 |
| EP | 2184212 | 5/2010 |

* cited by examiner

*Primary Examiner* — Rina Duda
(74) *Attorney, Agent, or Firm* — Miller, Matthias & Hull

(57) ABSTRACT

A method of actively discharging a common bus (116) of a machine (100) having an engine (102), a generator (112), a traction motor (124) and one or more auxiliary devices (126) is provided. The method may monitor a speed of the engine (102) with respect to a first threshold, monitor a voltage of the common bus (116) with respect to a second threshold, and enable one or more of the generator (112), the motor (124) and the auxiliary devices (126) if the engine speed falls below the first threshold and the voltage exceeds the second threshold so as to discharge voltage from the common bus (116).

20 Claims, 3 Drawing Sheets

ACTIVE HIGH VOLTAGE BUS BLEED DOWN

TECHNICAL FIELD

The present disclosure relates generally to electric drive assemblies, and more particularly, to systems and methods for actively discharging electrical buses.

BACKGROUND

A common or electrical bus is used in a variety of applications including work machines, vehicles and computers. Electrical buses may also be used in high voltage applications to deliver power from a power source to the electrical devices. An electrical bus is essentially a parallel circuit that is used to connect a plurality of electrical devices together with power sources, such as generators, solar cells, batteries, and the like. Moreover, electrical buses may be used in direct current (DC) applications and have a positive line and a negative line, or ground line, over which a potential voltage difference may be provided.

A problem that may arise in DC voltage applications is that electrical devices may store electrical power. Consequently, when the electrical bus is disconnected from a power source, the electrical devices continue to energize the electrical bus with the stored electrical power. Thus, a relatively long period of time may be required for the electrical bus to return to a low energy state where the electrical potential difference between the positive line and the negative line is minimal. As technicians are forced to wait for the electrical bus to return to a low energy state before beginning repairs, the total time required to repair and maintain such machines as well as the costs associated therewith are compounded dramatically.

Many currently existing high voltage electrical buses employ a bleeder resistor to help dissipate the stored energy once the associated power supply is shut off or disconnected. For example, U.S. Patent Application No. 2009/0141412 to Hickam discloses a discharge circuit having a power resistor that is connected across the positive and negative lines of the associated electrical bus for discharging current flow therethrough. While such bleeder resistors provide some degree of energy dissipation, the rate of discharge is still limited to a natural rate of decay which still requires a substantial wait time especially for high voltage applications. Furthermore, such discharge circuits and bleeder resistors are susceptible to failure, which may pose a significant safety risk in devices that are not equipped with secondary safeguards as a fallback.

The disclosed system and method is directed at overcoming one or more of the problems set forth above.

SUMMARY OF THE DISCLOSURE

In one aspect of the present disclosure, a method of actively discharging a common bus of a machine having an engine, a generator, a traction motor and one or more auxiliary devices is provided. The method monitors a speed of the engine with respect to a first threshold, monitors a voltage of the common bus with respect to a second threshold, and enables one or more of the generator, the motor and the auxiliary devices if the engine speed falls below the first threshold and the voltage exceeds the second threshold so as to discharge voltage from the common bus.

In another aspect of the disclosure, a method of actively discharging a common bus of a machine having an engine and a generator is provided. The method determines a speed threshold for the engine, determines a voltage threshold for the common bus, compares an immediate speed of the engine with the speed threshold, compares an immediate voltage of the common bus with the voltage threshold, and switches the generator into a motoring mode if the immediate speed of the engine falls below the speed threshold and the immediate voltage of the common bus exceeds the voltage threshold so as to partially discharge excess voltage from the common bus.

In yet another aspect of the disclosure, an active bleed down system for a machine having an engine, a generator, a traction motor and one or more auxiliary devices is provided. The active bleed down system comprises a common bus and a controller. The common bus is in electrical communication with at least one of the generator, the traction motor and the auxiliary devices of the machine. The controller is in electrical communication with at least the engine of the machine and the common bus. The controller is also configured to monitor a speed of the engine with respect to a first threshold, monitor a voltage of the common bus with respect to a second threshold, and enable one or more of the generator, the motor and the auxiliary devices if the engine speed falls below the first threshold and the voltage exceeds the second threshold so as to discharge voltage from the common bus.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
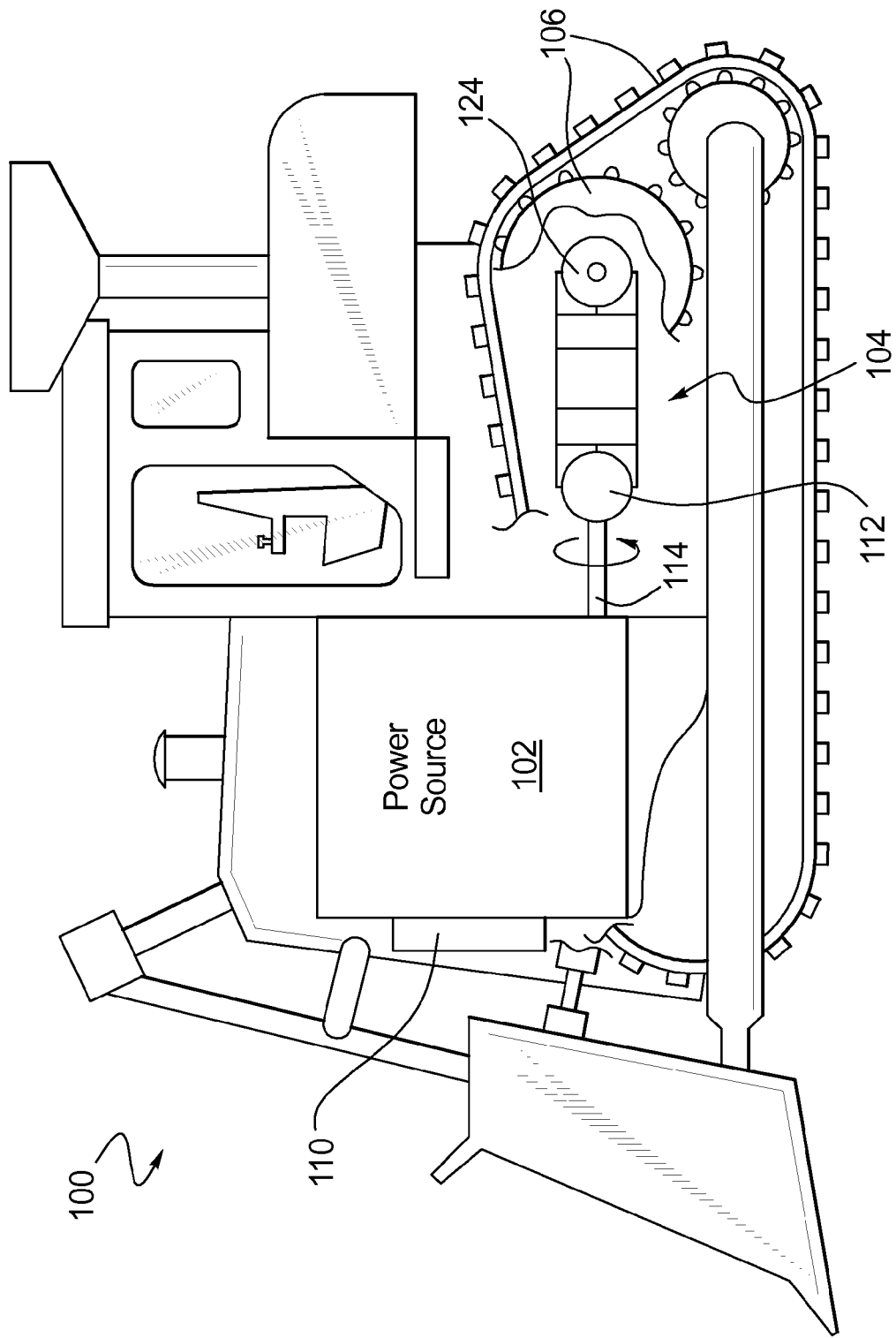
FIG. 1 is a diagrammatic view of a machine constructed in accordance with an exemplary embodiment of the present disclosure.

FIG. 1 diagrammatically illustrates a mobile machine 100 that may employ electric drive means for causing movement. More specifically, the machine 100 may include a primary power source 102 that is coupled to an electric drive 104 for causing movement via a traction device 106. Such a mobile machine 100 may be used as a work machine for performing a particular type of operation associated with an industry, such as mining, construction, farming, transportation, or any other suitable industry known in the art. For example, the machine 100 may be an earth moving machine, a marine vessel, an aircraft, a tractor, an off-road truck, an on-highway passenger vehicle, or any other suitable mobile machine.

Figure 2:
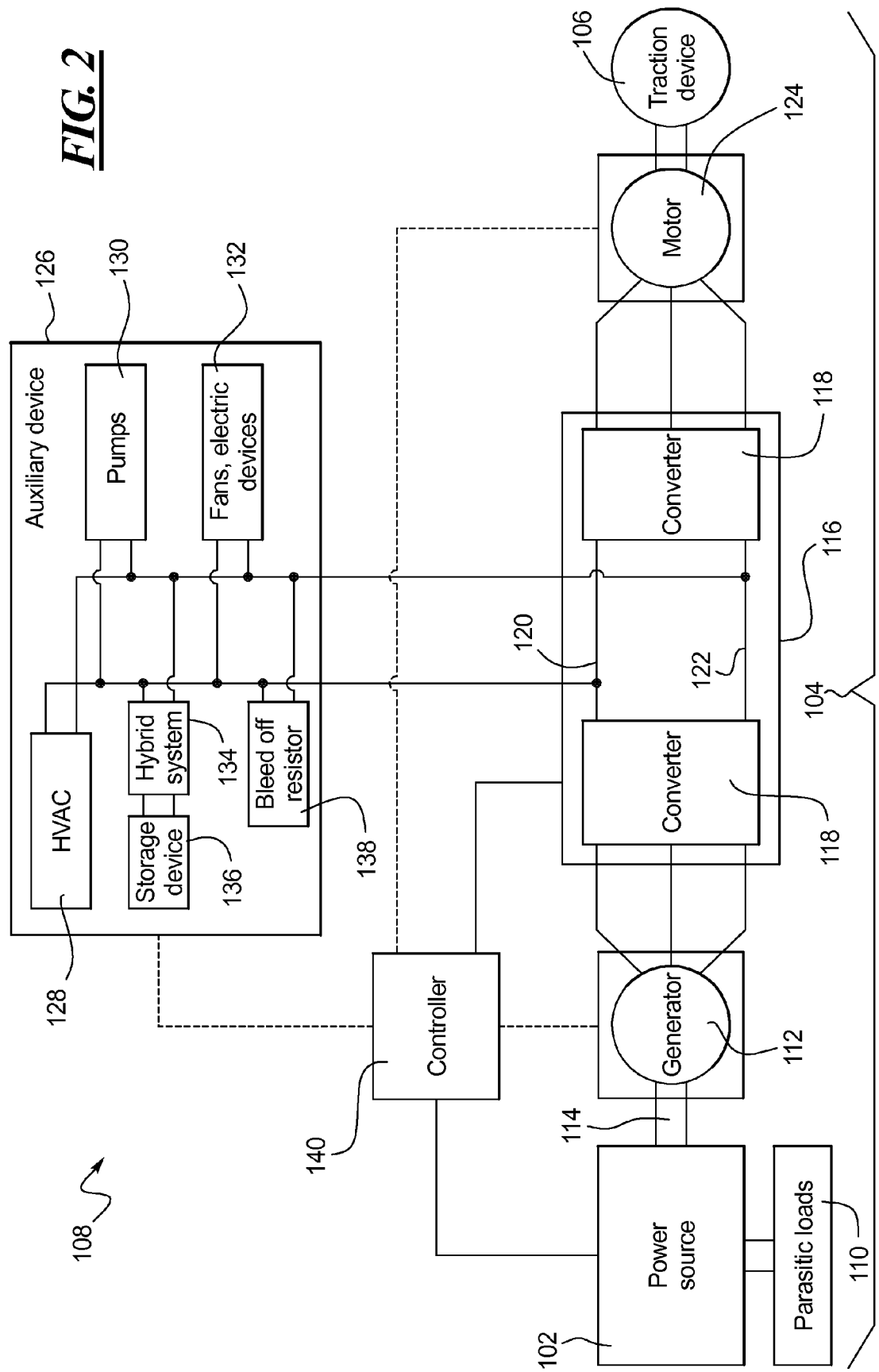
FIG. 2 is a schematic view of an exemplary embodiment of an active bleed down system as applied to a typical electric drive machine.

Turning to FIG. 2, an exemplary bleed down system 108, as applied to an electric drive 104 of a machine 100, is provided. The electric drive 104 may include a primary power source 102, such as a diesel engine, a gasoline engine, a natural gas engine, or any other type of combustion engine commonly used for generating power. The electric drive 104 may also be used in conjunction with any other suitable source of power such as, for example, a fuel cell, or the like. The engine 102 may be configured to directly or indirectly transmit power to parasitic loads 110 via belts, hydraulic systems, and the like. The engine 102 may also be configured to mechanically transmit power to a generator 112 via a coupling or axially rotating drive shaft 114.

The generator 112 of FIG. 2 may be a switched reluctance (SR) generator, or any other suitable generator configured to produce electrical power in response to rotational input from the engine 102. As is well known in the art, the generator 112 may include a rotor (not shown) that is rotatably disposed within a fixed stator (not shown). The rotor of the generator 112 may be rotatably coupled to an output of the engine 102 via a direct crankshaft, a gear train, a hydraulic circuit, or the like. The stator of the generator 112 may be coupled to a common bus 116 of the electric drive 104 via a converter circuit 118 having rectifiers, inverters, capacitors, and the like. During a generating mode of operation, as the rotor of the generator 112 is rotated within the stator by the primary power source 102, electrical current may be induced and supplied to the converter circuit 118. The converter circuit 118 may convert the electrical signals into the appropriate direct current (DC) voltage for distribution to the various electrical devices and subcomponents of the machine 100. Additionally, the generator 112 may be enabled to cause rotation of the rotor in response to electrical signals that are provided to the stator from the common bus 116, for instance, during a motoring mode of operation.

The common bus 116 may provide a positive line 120 and a negative or ground line 122 across which the common bus 116 may communicate a common DC bus voltage between one or more electrically parallel components of the machine 100. For instance, the common bus 116 may communicate power supplied by the engine 102 and the generator 112 to one or more motors 124 for causing motion via a traction device 106. Specifically, the first converter circuit 118 associated with the generator 112 may provide a DC signal to be transmitted to a second converter circuit 118 associated with one or more motors 124. The second converter circuit 118 may convert the DC signal into the appropriate phase signals necessary for driving the motors 124. The common bus 116 may also communicate the common DC voltage to auxiliary devices 126 of the machine 100 including, for instance, heating ventilation and cooling (HVAC) systems 128, high voltage pumps 130, high voltage fans 132, or any other electrical device that may be operated by the common DC voltage. The auxiliary devices 126 may additionally include a secondary power source or hybrid system 134 configured to store any of the common DC voltage within a rechargeable energy storage device 136, such a battery or a large capacitor. In such embodiments, the common bus 116 may be configured such that power stored within the energy storage device 136 may be selectively communicated to the generator 112 and/or the one or more motors 124 so as to minimize the fuel or energy that is consumed by the power source 102. In still further alternatives, the auxiliary devices 126 may be provided with a switched bleed off resistor 138 that may be selectively engaged between the positive and negative lines 120, 122 so as to passively discharge any excess voltage in the common bus 116.

As shown for example in FIG. 2, the common bus 116 may further be provided with a means to actively bleed down or discharge excess voltage that is stored within the common bus 116. More specifically, the bleed down system 108 may be provided with a controller 140 in communication with at least the common bus 116 and the primary power source or engine 102 of the machine 100. The controller 140 may monitor immediate operating conditions of the machine 100, and further, determine whether the common bus voltage should be dissipated based on those operating conditions. The operating conditions may be indicative of, for example, the load of the machine 100, a ground speed of the machine 100, the desired operation of the machine 100 as input by the operator, and the like. Based on such operating conditions of the machine 100, if the controller 140 determines that the common bus voltage should be bled down, the controller 140 may relieve the bus voltage by enabling one or more of the generator 112, the traction motor 124, the auxiliary devices 126, or any other device that receives power from the common bus 116.

In one particular embodiment, the controller 140 may engage the generator 112 in a motoring mode of operation so as to at least partially relieve excess bus voltage. Accordingly, the controller 140 of the bleed down system 108 may communicate with the generator 112 so as to determine and/or select the operating mode thereof. Control of a switched reluctance generator, for example, may be managed via direct connections to the switches and/or windings of the switched reluctance generator. The controller 140 may also be configured to discharge the bus voltage through the traction motor 124, the HVAC system 128, high voltage pumps 130, high voltage fans 132, or any combination thereof. Using the hybrid system 134, the controller 140 may also be configured to condition and store the discharged bus voltage in the energy storage device 136 for later use. By enabling such devices, the controller 140 may be able to safely discharge the bus voltage using existing components and operations that are typically performed from within the machine 100.

Operations of the bleed down system 108 may be embedded or integrated into the existing controls of the machine 100. Moreover, the controller 140 may be implemented using one or more of a processor, a microprocessor, a microcontroller, an electronic control module (ECM), an electronic control unit (ECU), or any other suitable means for electronically controlling functionality of the bleed down system 108. The controller 140 may be configured to operate according to a predetermined algorithm or set of instructions for controlling the bleed down system 108 based on the various operating conditions of the machine 100. Such an algorithm or set of instructions may be preprogrammed or incorporated into a memory of the controller 140 as is commonly used in the art.

Figure 3:
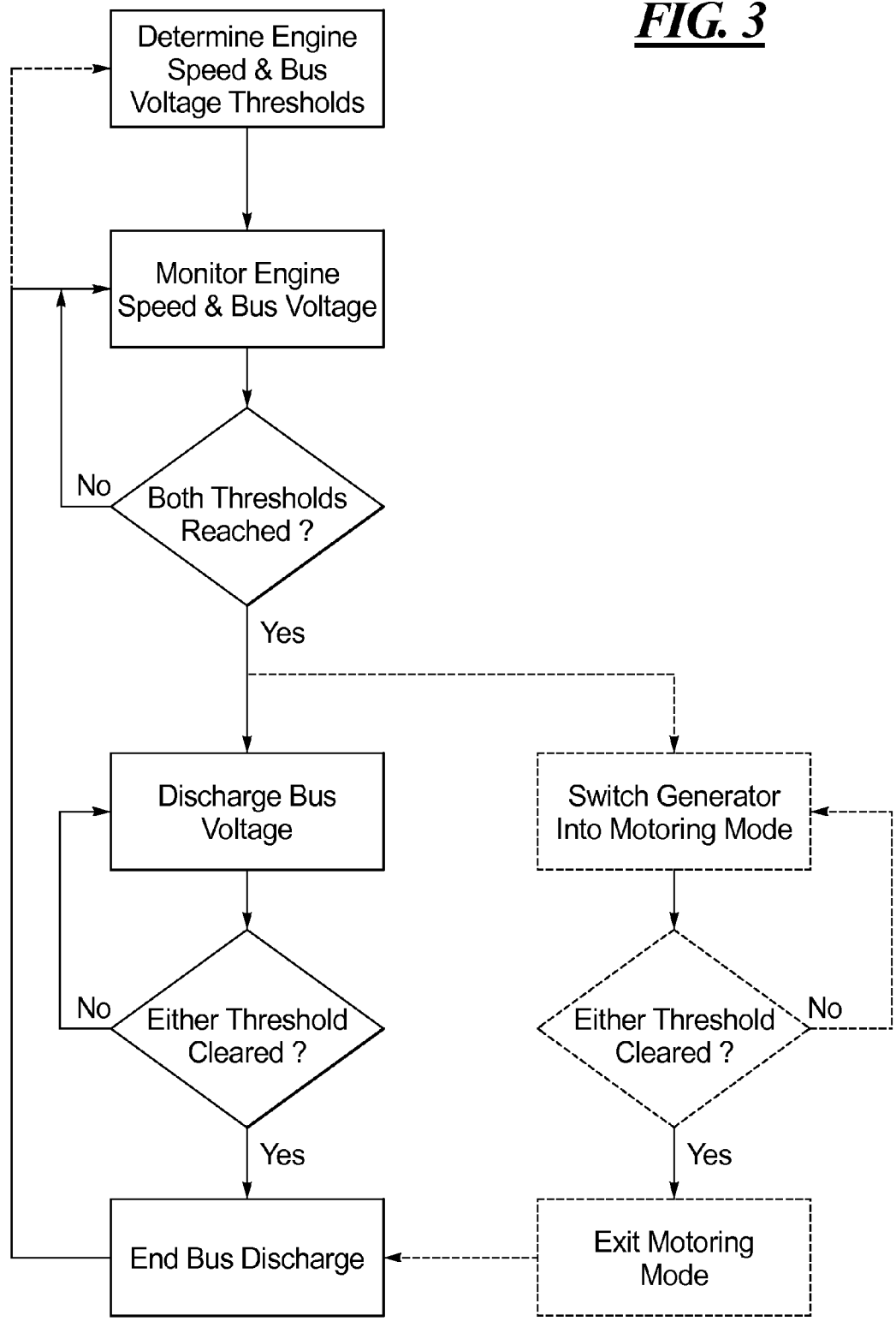
FIG. 3 is a flow diagram of an exemplary method of actively discharging an electrical common bus of a machine.

Referring now to the flow diagram of FIG. 3, an exemplary method for actively bleeding down or discharging a common bus 116 of a machine 100 is disclosed. The method disclosed may be implemented as an algorithm or a set of program codes by which the controller 140 is configured to operate. As shown, the controller 140 may initially determine a set of thresholds by which to monitor one or more parameters of the machine 100 that are relevant to the common bus voltage. For instance, the controller 140 may determine a first threshold or a lower limit for the engine speed as well as a second threshold or an upper limit for the common bus voltage. The appropriate first and second thresholds may be determined based on a combination of the immediate operating conditions of the machine 100, such as the load on the machine 100, the ground speed of the machine 100, operator input, and the like. Alternatively, the thresholds for engine speed and bus voltage may be predefined values that are preprogrammed into the controller 140. In further alternatives, a plurality of predefined thresholds may be mapped to different operating conditions of the machine 100 so as to enable the controller 140 to retrieve the ideal set of thresholds to be employed based on the immediate operating condition detected.

The controller 140 of FIG. 2 may communicate with at least the engine 102 and the common bus 116 of the electric drive 104 so as to monitor the immediate engine speed and bus voltage during normal operation of the machine 100, as shown in FIG. 3. Moreover, the controller 140 may continuously compare the immediate engine speed with the engine speed threshold, and further, compare the immediate common bus voltage with the bus voltage threshold. If both thresholds are reached, for example, if the immediate engine speed falls below the minimum speed threshold and the bus voltage exceeds the maximum voltage threshold, the controller 140 may determine that a potentially unsafe level of electrical power is being stored in the common bus 116 without adequate relief thereof. Accordingly, as shown in FIG. 3, the controller 140 may proceed to discharge the voltage of the common bus 116 by enabling the generator 112, traction motor 124, one or more auxiliary devices 126, or any combination thereof. By sourcing the bus voltage to the generator 112, the traction motor 124, the HVAC system 128, high voltage pumps 130 or fans 132, the common bus 116 may be safely discharged from within the machine 100 while performing typical operations or functions that may be required by the machine 100 or its operator.

In the embodiment of FIG. 3, the controller 140 may be configured to engage the generator 112 into a motoring mode of operation if, for example, the immediate engine speed falls below the minimum speed threshold and the bus voltage exceeds the maximum voltage threshold. The manner by which the controller 140 engages motoring mode of the generator 112 may vary depending on the configuration and type of generator 112 being used. In configurations in which the generator 112 is a switched reluctance type of generator, for example, the controller 140 may engage motoring mode by inducing a switched electrical current to each of the phases of the generator 112 and providing the appropriate sequence of pulses to each phase by chopping, pulse-width modulation, or any other suitable means commonly used in the art. By redirecting the electrical power stored in common bus 116 back into the generator 112 and causing the rotor of the generator 112 to rotate, the controller 140 may efficiently discharge the common bus voltage to a safer level. In such a way, the controller 140 may engage the generator 112 in motoring mode until one or more of the thresholds have been cleared. For example, if the common bus voltage falls below the maximum voltage threshold or if the engine speed is determined to exceed the minimum speed threshold, the controller 140 may stop inducing electrical current from the common bus 116 to the generator 112 and exit motoring mode, as shown in FIG. 3. Once the controller 140 exits motoring mode, the controller 140 may return to monitoring the engine speed and the common bus voltage. Alternatively, the controller 140 may return to determining new engine speed and bus voltage thresholds before returning to the monitoring step.

Industrial Applicability

In general, the foregoing disclosure finds utility in various industrial applications, such as the farming, construction and mining industries in providing more efficient bleed down of electrical buses in high voltage mobile work vehicles and/or machines, such as tractors, backhoe loaders, compactors, feller bunchers, forest machines, industrial loaders, skid steer loaders, wheel loaders, and the like. The systems and methods disclosed herein discharge the energy stored in electrical buses by engaging a one or more existing devices of the machine into a motoring mode of operation. As the electrical bus can be quickly discharged and worked on by technicians, the down time spent for repairs and/or maintenance is significantly reduced.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of actively discharging a common bus of a machine having an engine, a generator, a traction motor and one or more auxiliary devices, the method comprising:
   monitoring a speed of the engine with respect to a first lower threshold;
   monitoring a voltage of the common bus with respect to a second upper threshold; and
   enabling one or more of the generator, the motor and the auxiliary devices if the engine speed falls below the first lower threshold and the voltage exceeds the second upper threshold so as to discharge voltage from the common bus.

2. The method of claim 1, wherein the auxiliary devices include one or more of a heating ventilation and cooling HVAC system, a high voltage pump, a high voltage fan and a bleeder resistor for passively discharging electrical energy in the common bus.

3. The method of claim 1, wherein the auxiliary devices include a hybrid system for conditioning and storing the voltage discharged by the common bus in an energy storage device.

4. The method of claim 1, wherein the generator is switched into a motoring mode of operation if the engine speed falls below the first threshold and the voltage exceeds the second threshold so as to discharge voltage from the common bus.

5. The method of claim 4 further comprising a step of switching the generator out of the motoring mode if the voltage of the common bus falls below the second threshold.

6. The method of claim 1, wherein the first threshold is based on at least one of a load of the machine, a ground speed of the machine and operator input.

7. The method of claim 1, wherein the generator is a switched reluctance generator.

8. A method of actively discharging a common bus of a machine having an engine and a generator, the method comprising:
   determining a lower speed threshold for the engine;
   determining an upper voltage threshold for the common bus;
   comparing an immediate speed of the engine with the lower speed threshold;
   comparing an immediate voltage of the common bus with the upper voltage threshold; and
   switching the generator into a motoring mode if the immediate speed of the engine falls below the lower speed threshold and the immediate voltage of the common bus exceeds the upper voltage threshold so as to partially discharge excess voltage from the common bus.

9. The method of claim 8, wherein the each of the speed and voltage thresholds is based on one or more immediate operating conditions of the machine.

10. The method of claim 8, wherein the speed threshold is based on at least one of a load of the machine, a ground speed of the machine and operator input.

11. The method of claim 8 further comprising a step of switching the generator out of motoring mode if the voltage of the common bus falls below the voltage threshold.

12. The method of claim 8, wherein the generator is a switched reluctance generator.

13. An active bleed down system for a machine having an engine, a generator, a traction motor and one or more auxiliary devices, the active bleed down system comprising:
   a common bus in electrical communication with at least one of the generator, the traction motor and the auxiliary devices of the machine; and a controller in electrical communication with at least the engine of the machine and the common bus, the controller configured to monitor a speed of the engine with respect to a first lower threshold, monitor a voltage of the common bus with respect to a second upper threshold, and enable one or more of the generator, the motor and the auxiliary devices if the engine speed falls below the first lower threshold and the voltage exceeds the second upper threshold so as to discharge voltage from the common bus.

14. The system of claim 13, wherein the auxiliary devices includes one or more of a heating ventilation and cooling HVAC system, a high voltage pump, a high voltage fan and a bleeder resistor for passively discharging electrical energy in the common bus.

15. The system of claim 13, wherein the auxiliary devices include a hybrid system for conditioning and storing the voltage discharged by the common bus in an energy storage device.

16. The system of claim 13, wherein the controller switches the generator into a motoring mode of operation if the engine speed falls below the first threshold and the voltage exceeds the second threshold, and switches the generator out of the motoring mode if the voltage of the common bus falls below the second threshold.

17. The system of claim 13, wherein the controller is configured to determine the first threshold based on one or more immediate operating conditions of the machine.

18. The system of claim 13, wherein the first threshold is based on at least one of a load of the machine, a ground speed of the machine and operator input.

19. The system of claim 13, wherein the controller is configured to determine the second threshold based on one or more immediate operating conditions of the machine.

20. The system of claim 13, wherein the generator is a switched reluctance generator.

* * * * *

UNITED STATES PATENT AND TRADEMARK OFFICE
CERTIFICATE OF CORRECTION

| | | |
|---|---|---|
| PATENT NO. | : 8,610,382 B2 | Page 1 of 1 |
| APPLICATION NO. | : 12/978041 | |
| DATED | : December 17, 2013 | |
| INVENTOR(S) | : Goldammer et al. | |

It is certified that error appears in the above-identified patent and that said Letters Patent is hereby corrected as shown below:

In the Specification,

Column 5, line 47, delete "Industrial Applicability" and insert -- INDUSTRIAL APPLICABILITY --.

Column 5, line 49, delete "fanning," and insert -- farming, --.

Signed and Sealed this
Eighth Day of September, 2015

Michelle K. Lee
*Director of the United States Patent and Trademark Office*